3,286,791
LUBRICATING SYSTEM
Daniel B. Cofer, Carrollton, Ga., Herman Kudla, Chicago, and William C. Martin, Naperville, Ill., and Dale D. Proctor, Carrollton, Ga.; said Kudla and said Martin assignors to Western Electric Company, Incorporated, New York, N.Y., a corporation of New York and said Cofer and said Proctor assignors to Southwire Company, Incorporated, Carrollton, Ga., a corporation of Georgia
Filed Sept. 25, 1964, Ser. No. 399,136
6 Claims. (Cl. 184—6)

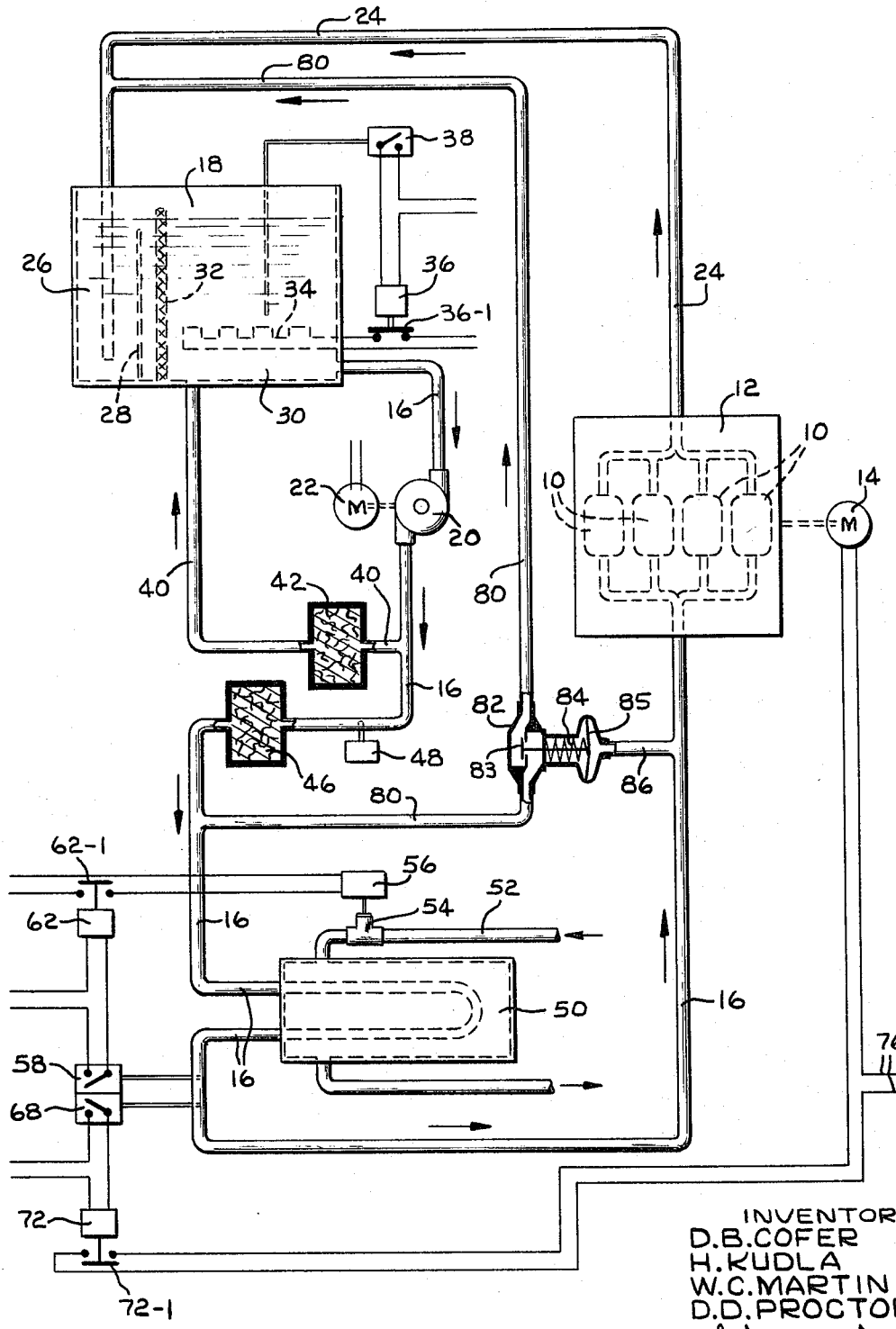

The present invention relates to a lubricating system, and more particularly to a system for conditioning a supply of oil and circulating it to and from an apparatus for lubricating portions thereof.

An object of the invention is to provide an improved lubricating system.

Another object of the invention is to provide a system for conditioning a supply of oil and circulating it to and from an apparatus at a predetermined viscosity and pressure to lubricate portions thereof.

A further object of the invention is to provide a system for supplying lubricating oil at a predetermined pressure to an apparatus having drive mechanism for actuating the apparatus and for preventing the operation of the apparatus until the pressure of the oil has reached a prescribed value.

The single drawing diagrammatically illustrates a system for lubricating bearings or other parts 10 of an apparatus 12, as for example, an apparatus for continuously rolling copper rod. The apparatus is actuated by a drive mechanism including a motor 14. Oil for lubricating the apparatus is supplied thereto through a supply line 16 from a tank 18 for holding a supply of the lubricating oil. A pump 20 is driven by a motor 22 at a constant speed to advance the oil through the supply line at a uniform rate.

From the bearings 10 of the apparatus the oil flows through a return line 24 into a receiving compartment 26 of the tank 18. A vertical partition 28 extending a predetermined distance upwardly from the bottom wall of the tank divides the tank into the receiving compartment 26 and a reservoir compartment 30. In the reservoir compartment 30 adjacent the partition 28 a screen filter 32 is provided for filtering the oil before it is withdrawn from the tank.

The oil in the tank 18 is heated by heating elements 34 to predetermined temperature as for example approximately 125° F. to condition the oil to a predetermined viscosity and to enable the heated oil to be utilized to heat the bearings and the associated components of the apparatus to a normal elevated operating temperature. The heating elements 34 are connectible to a suitable source of electrical power through the contacts 36–1 of a relay 36 which is controlled by an adjustable temperature control device 38 that is responsive to the temperature of the oil in the tank 30.

A portion of the oil withdrawn from the tank 18 through the supply line 16 by the pump 20, as for example 25% thereof, is returned to the reservoir compartment 30 of the tank 18 through a by-pass line 40 and passes through and is cleaned by a filter 42 in the by-pass line for removing fine particles. The remainder of the oil in the supply line 16 is passed through a filter 46 connected into the supply line 16 for removing coarser particles.

Also connected to the supply line 16 and responsive to the pressure of the oil flowing into the filter 46 is an indicating or signal device 48. This device is adjustable and is set to operate when the pressure of the oil in the line exceeds a preset value, as for example 20 p.s.i., so as to indicate an obstruction to the free flow of oil through the filter 46.

After leaving the filter 46, the oil passes through a heat exchanger 50 which is provided in the supply line for cooling the oil to the predetermined temperature (125° F.) in the event the oil has been heated to a higher temperature in its passage through the apparatus 12. A coolant is supplied to the heat exchanger 50 from a suitable source thereof through a pipe line 52 and the flow of the coolant is controlled by a normally closed valve 54 in the pipe line. The valve 54 is actuated to an open position by a solenoid 56 in response to energization thereof to effect the flow of coolant through the heat exchanger 50 and the reduction in temperature of the lubricating oil flowing therethrough.

Connected to the supply line 16 intermediate the heat exchanger 50 and the apparatus 12 is a control device 58 which is responsive to the temperature of the oil flowing to the apparatus. The control device 58 includes a pair of contacts connected in series with a relay 62 to a source of power, and the control device 58, which is adjustable, is preset to effect the energization of the relay 62 in response to the rise in temperature of the oil above the prescribed value of 125° F. With the energization of the relay 62 a power circuit is closed to effect the energization of the solenoid 56 resulting in the opening of the valve 54, the circulation of the coolant through the heat exchanger 50, and the reduction in the temperature of the oil flowing through the heat exchanger. When the temperature of the oil has been reduced to the prescribed value, the control device 58 operates to effect the de-energization of the relay 62 and the solenoid 56, the closing of the valve 54, and the stopping of the flow of coolant through the heat exchanger 50.

Also connected to the supply line 16 intermediate the heat exchanger 50 and the apparatus 12 is an adjustable control device 68 which is responsive to the pressure of the lubricating oil supplied to the apparatus 12. The control device 68 is set to a predetermined pressure, as for example 5 p.s.i. and has a pair of normally open contacts which are connected in series with a relay 72 to a source of electrical power. The relay 72 has a pair of normally open contacts 72–1 which are connected in series with the motor 14 to a source of electrical power 76. The arrangement is such that when operation of the lubricating system is started, the circuit to the motor 14 for driving the apparatus 12 is open at the relay contacts 72–1 and remains open until the pressure of the oil in the supply line 16 rises to the predetermined value (5 p.s.i.), at which time the control device 68 is actuated to effect the energization of the relay 72 and the closing of a relay contact 72–1, resulting in the operation of the motor 14 and of the apparatus 12.

A second by-pass line 80 to the tank 18 is connected to the supply line 16 intermediate the filter 46 and the heat exchanger 50 and is provided with a pressure responsive valve 82. The movable element 83 of the valve is spring biased to a normal closed position and is connected to a diaphragm 84 in a chamber 85 of the valve, the diaphragm being responsive to variations in pressure of the oil supplied to the apparatus 12 from the supply line 16 to which the valve is connected by line 86. The valve 82 is set to open at a predetermined pressure, as for example 15 p.s.i., so that when the pressure of the oil supplied to the apparatus 12 exceeds such predetermined value, the valve 82 is actuated to open position to allow some of the oil in the supply line 16 to by-pass the apparatus 12 and return to the tank 18 and thus prevent the oil pressure from rising above such preselected value.

In the operation of the system, after the type of lubricating oil has been selected, and the temperature or viscosity of the oil, and the pressure at which it is to be supplied to the apparatus are determined, the temperature control device 38 is adjusted to a predetermined temperature setting (125° F.) to effect the heating of the oil in the tank 18 to the desired temperature, the temperature-responsive control device 58 for monitoring the temperature of the oil supplied to the apparatus is adjusted to the same temperature setting (125° F.), and the pressure-responsive control device 68 for monitoring the pressure of the oil supplied to the apparatus is adjusted to the desired pressure setting (5 p.s.i.).

The heaters 34 are connected to the electrical power source and the oil is heated to the preselected temperature (125° F.) under control of the temperature control device 38. The pump motor 22 is then connected to the power source to effect the operation of the pump 20 and the flow of oil from the tank 18 through the supply line 16 to the apparatus 12. The drive means including the motor 14 for the apparatus 12 remains in an inoperative condition until the pressure of the oil in the supply line 16 builds up to the predetermined value (5 p.s.i.), at which time the pressure control device 68 is actuated to effect the connection of the motor 14 to the power source and the operation of the apparatus 12.

With the apparatus 12 and the lubricating system operating, a portion of the oil pumped from the tank 18 passes through and is cleaned by the filter 42 and returns to the tank. The remainder of the oil passes through the filter 46, the heat exchanger 50, the apparatus 12, and returns to the tank 18. As the oil travels from the heat exchanger to the apparatus 12 it is monitored by the heat responsive device 58, and, if the temperature of the oil is above the preselected value (125° F.), the control device 58 is actuated to cause the valve 54 to open and the coolant to flow through the heat exchanger 50 and effect the lowering of the temperature of the oil to the prescribed value (125° F.). With the reduction in temperature of the oil to the desired value, the control device 58 is again actuated to effect the closing of the valve 54 and the stopping of the flow of coolant through the heat exchanger 50.

When the pressure of the oil supplied to the apparatus 12 exceeds the predetermined value (15 p.s.i.), the normally closed pressure-responsive valve 82 in the by-pass line 80 will be actuated to an open position to cause some of the oil in the supply line 16 to by-pass the apparatus 12 and return to the supply tank 18 and thereby effect the control of the oil pressure so as not to exceed the preselected value.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A system for lubricating an apparatus which comprises:
    a tank for holding a supply of oil and having a supply line to and a return line from the apparatus;
    means for heating the oil in said tank to a temperature of a predetermined value;
    means for advancing the oil in said supply line;
    a heat exchanger connected into said supply line for passage of the oil therethrough;
    means for circulating a coolant in said heat exchanger; and
    control means responsive to the temperature of the oil supplied to the apparatus for rendering said coolant circulating means operative and unoperative in response to the changes in the temperature of the oil above and below said predetermined value.

2. A system for lubricating an apparatus which comprises:
    a tank for holding a supply of oil and having a supply line to and a return line from the apparatus;
    means in said tank for heating the oil to a temperature of a predetermined value;
    means for advancing the oil in said supply line;
    a heat exchanger connected into said supply line for passage of the oil therethrough;
    means for circulating a coolant in said heat exchanger;
    control means responsive to the temperature of the oil supplied to the apparatus for rendering said coolant circulating means operative and unoperative in response to the changes in the temperature of the oil above and below said predetermined value; and
    means connected to said supply line and responsive to the pressure of the oil supplied to the apparatus for by-passing some of the oil to the tank in response to an increase in pressure above a predetermined value of the oil supplied to the apparatus.

3. A system for lubricating an apparatus having drive means for actuating the apparatus, said system comprising:
    a tank for holding a supply of oil and having a supply line to the apparatus and a return line from the apparatus;
    means for heating the oil in said tank to a temperature of a predetermined value;
    means for advancing the oil in said supply line;
    a heat exchanger connected to said supply line for passage of the oil therethrough;
    means for circulating a coolant through said heat exchanger;
    control means responsive to the temperature of the oil supplied to the apparatus for rendering said coolant circulating means operative and unoperative in response to changes in temperature of the oil above and below said predetermined value; and
    means responsive to the pressure of the oil supplied to the apparatus for rendering the drive means operative and unoperative in response to changes in the pressure above and below a preselected value of the oil supplied to the apparatus.

4. A system for lubricating an apparatus having drive means for actuating the apparatus which comprises:
    a tank for holding a supply of oil and having a supply line to and a return line from the apparatus;
    means for advancing the oil in said supply line from said tank to the apparatus;
    means for heating the oil in said tank to a temperature of a predetermined value;
    means associated with said supply line and responsive to the temperature of the oil supplied to the apparatus for cooling the oil to a temperature of said predetermined value when the temperature of the oil supplied to the apparatus exceeds such predetermined value;
    means responsive to the pressure of the oil supplied to the apparatus for by-passing some of the oil from said supply line to said tank in response to an increase in the pressure of the oil supplied to the apparatus above a predetermined value; and
    means responsive to the pressure of the oil supplied to the apparatus for rendering the drive means operative and unoperative respectively in response to changes in the oil pressure above and below a preselected value.

5. A system for lubricating an apparatus having drive means for actuating the apparatus which comprises:
    a tank for holding a supply of oil and having a supply line to and a return line from the apparatus;
    means for heating the oil in said tank to a temperature of a predetermined value;
    pumping means for advancing the oil in said supply line;

a heat exchanger connected to said supply line for passage of the oil therethrough;

means for circulating a coolant in said heat exchanger;

control means responsive to the temperature of the oil supplied to the apparatus for rendering said coolant circulating means operative and unoperative in response to the changes in temperature of the oil above and below said predetermined value;

a by-pass line connected to said supply line between said pumping means and the apparatus for returning the oil to said tank and by-passing the apparatus;

a normally closed pressure responsive valve in said by-pass line for stopping the flow of oil therethrough and having means connected to said supply line and responsive to the pressure of the oil supplied to the apparatus for actuating said valve to open position in response to the increase in pressure of the oil to a predetermined value; and means responsive to the pressure of the oil supplied to the apparatus for rendering the drive means operative and unoperative in response to changes in the oil pressure above and below a preselected value.

6. A system for lubricating an apparatus having drive means for actuating the apparatus, said system comprising:

a tank for holding a supply of oil and having a supply line to and a return line from the apparatus;

pumping means for advancing the oil in said supply line from said tank to the apparatus;

means in said supply line for filtering the oil supplied to the apparatus;

means for heating the oil in said tank to a temperature of a predetermined value;

means associated with said supply line and responsive to the temperature of the oil supplied to the apparatus for cooling the oil to a temperature of said predetermined value when the temperature of the oil in said supply line exceeds such predetermined value;

means responsive to the pressure of the oil supplied to the apparatus for by-passing some of the oil to said tank in response to an increase in the pressure of the oil supplied to the apparatus above a predetermined value;

means responsive to the pressure of the oil supplied to the apparatus for rendering the drive means operative and unoperative in response to changes in the oil pressure above and below a preselected value;

conduit means connected to said supply line for continuously by-passing a portion of the oil withdrawn by said pumping means and returning it to said tank; and means in said conduit means for filtering the oil passing therethrough to remove the relatively fine particles therefrom.

References Cited by the Examiner
UNITED STATES PATENTS 2,907,527   10/1959   Cummings.
3,090,365   5/1963    Constantino _____ 184—6

LAVERNE D. GEIGER, *Primary Examiner.*

H. BELL, *Assistant Examiner.*